US009317823B2

(12) United States Patent
Muirhead

(10) Patent No.: US 9,317,823 B2
(45) Date of Patent: *Apr. 19, 2016

(54) EMBEDDED RFID DEVICE FOR TRACKING A REUSABLE MATERIAL HANDLING DEVICE

(75) Inventor: Scott A. W. Muirhead, Surrey (CA)

(73) Assignee: NEXTREME, LLC, Langley, British Columbia (CA)

( * ) Notice: Subject to any disclaimer, the term of this patent is extended or adjusted under 35 U.S.C. 154(b) by 228 days.

This patent is subject to a terminal disclaimer.

(21) Appl. No.: 13/506,846

(22) Filed: May 21, 2012

(65) Prior Publication Data

US 2012/0280046 A1 Nov. 8, 2012

Related U.S. Application Data

(63) Continuation of application No. 13/068,943, filed on May 25, 2011, which is a continuation-in-part of application No. 11/981,091, filed on Oct. 31, 2007, now Pat. No. 8,077,040, which is a continuation of application No. 11/152,628, filed on Jun. 14, 2005, now Pat. No. 7,342,496, which is a continuation-in-part of application No. 09/770,097, filed on Jan. 24, 2001, now Pat. No. 6,943,678.

(60) Provisional application No. 60/177,383, filed on Jan. 24, 2000.

(51) Int. Cl.
G08B 1/08 (2006.01)
G06Q 10/06 (2012.01)
(Continued)

(52) U.S. Cl.
CPC ........ *G06Q 10/0631* (2013.01); *B65D 19/0016* (2013.01); *B65D 19/38* (2013.01); *G06K 19/07758* (2013.01); *G06K 19/07792* (2013.01); *G06Q 50/28* (2013.01); *G08B 13/2474* (2013.01); *H01Q 1/2225* (2013.01); *H01Q 21/24* (2013.01); *H01Q 21/28* (2013.01); *H04W 4/02* (2013.01); *B65D 2203/10* (2013.01); *B65D 2519/00034* (2013.01); *B65D 2519/00069* (2013.01); *B65D 2519/00139* (2013.01); *B65D 2519/00273* (2013.01); *B65D 2519/00293* (2013.01); *B65D 2519/00303* (2013.01); *B65D 2519/00323* (2013.01); *B65D 2519/00333* (2013.01); *B65D 2519/00358* (2013.01);
(Continued)

(58) Field of Classification Search
CPC ................ G06Q 10/0631; G06K 19/07758
USPC .............. 340/506, 517, 521, 539.1, 539.11, 340/539.13
See application file for complete search history.

(56) References Cited

U.S. PATENT DOCUMENTS 6,069,564 A 5/2000 Hatano et al.
6,107,920 A 8/2000 Eberhardt et al.
(Continued)

FOREIGN PATENT DOCUMENTS

FR 2249522 1/1991

*Primary Examiner* — Daryl Pope
(74) *Attorney, Agent, or Firm* — Price & Adams, P.C.

(57) ABSTRACT

A method of embedding RF equipment in a reusable material handing apparatus for the purposes of managing the apparatus with the device is described. In one embodiment, the RF equipment includes a low cost RFID tag, label, placard or like, which is incorporated into the apparatus. Each RFID device responds to a management radio frequency signal with a unique reply to wirelessly identify the individual apparatus. RFID tags, labels, placards and the like typically comprise a first substrate layer to support the components of the RFID device and a second laminate layer to cover the RFID device and provide a printable surface for a serial number, trade name, bar code, manufacture date, country of origin and the like. The methods involve embedding RFID devices into the apparatus during the original manufacture or assembly and disassembly of the apparatus.

13 Claims, 11 Drawing Sheets

(51) Int. Cl.
  B65D 19/00 (2006.01)
  B65D 19/38 (2006.01)
  G06K 19/077 (2006.01)
  G08B 13/24 (2006.01)
  H01Q 1/22 (2006.01)
  H01Q 21/24 (2006.01)
  H01Q 21/28 (2006.01)
  G06Q 50/28 (2012.01)
  H04W 4/02 (2009.01)
  H04W 88/06 (2009.01)

(52) U.S. Cl.
  CPC ............... *B65D2519/00437* (2013.01); *B65D 2519/00442* (2013.01); *B65D 2519/00562* (2013.01); *B65D 2519/00567* (2013.01); *H04W 88/06* (2013.01); *Y02W 30/807* (2015.05); *Y10T 29/49826* (2015.01)

(56) References Cited

U.S. PATENT DOCUMENTS

| | | | |
|---|---|---|---|
| 6,147,662 A | 11/2000 | Grabau et al. | |
| 6,172,609 B1 * | 1/2001 | Lu et al. | 340/572.4 |
| 6,246,882 B1 * | 6/2001 | Lachance | 455/456.4 |
| 6,278,413 B1 | 8/2001 | Hugh et al. | |
| 6,407,669 B1 | 6/2002 | Brown et al. | |
| 6,441,740 B1 | 8/2002 | Brady et al. | |
| 6,557,766 B1 | 5/2003 | Leighton | |
| 6,809,703 B2 | 10/2004 | Serra | |
| 6,814,284 B2 | 11/2004 | Ehlers et al. | |
| 6,814,287 B1 | 11/2004 | Chang et al. | |
| 6,998,983 B2 | 2/2006 | Charych et al. | |
| 7,075,435 B2 | 7/2006 | Jesser | |
| 7,084,740 B2 | 8/2006 | Bridgetall | |
| 7,271,726 B2 | 9/2007 | Holton | |
| 7,323,990 B2 | 1/2008 | Urban | |
| 7,379,024 B2 * | 5/2008 | Forster et al. | 343/700 MS |
| 7,450,007 B2 | 11/2008 | Cook et al. | |
| 7,598,867 B2 | 10/2009 | Carrender | |
| 7,841,281 B2 | 11/2010 | Valentinsson | |
| 7,948,384 B1 * | 5/2011 | Kennedy | 340/572.8 |
| 8,217,849 B2 * | 7/2012 | Sardariani et al. | 343/793 |
| 8,228,201 B2 | 7/2012 | Kennedy | |
| 2002/0067267 A1 | 6/2002 | Kirkham | |
| 2005/0040934 A1 * | 2/2005 | Shanton | 340/5.92 |
| 2005/0242959 A1 | 11/2005 | Watanabe | |
| 2006/0043199 A1 | 3/2006 | Babe et al. | |
| 2007/0152831 A1 | 7/2007 | Elsele | |
| 2007/0182559 A1 | 8/2007 | Lawrence et al. | |
| 2008/0024309 A1 | 1/2008 | Balhoff et al. | |
| 2008/0246614 A1 | 10/2008 | Paananen | |
| 2009/0289777 A1 | 11/2009 | Goll et al. | |
| 2011/0253792 A1 | 10/2011 | Tuttle et al. | |

* cited by examiner

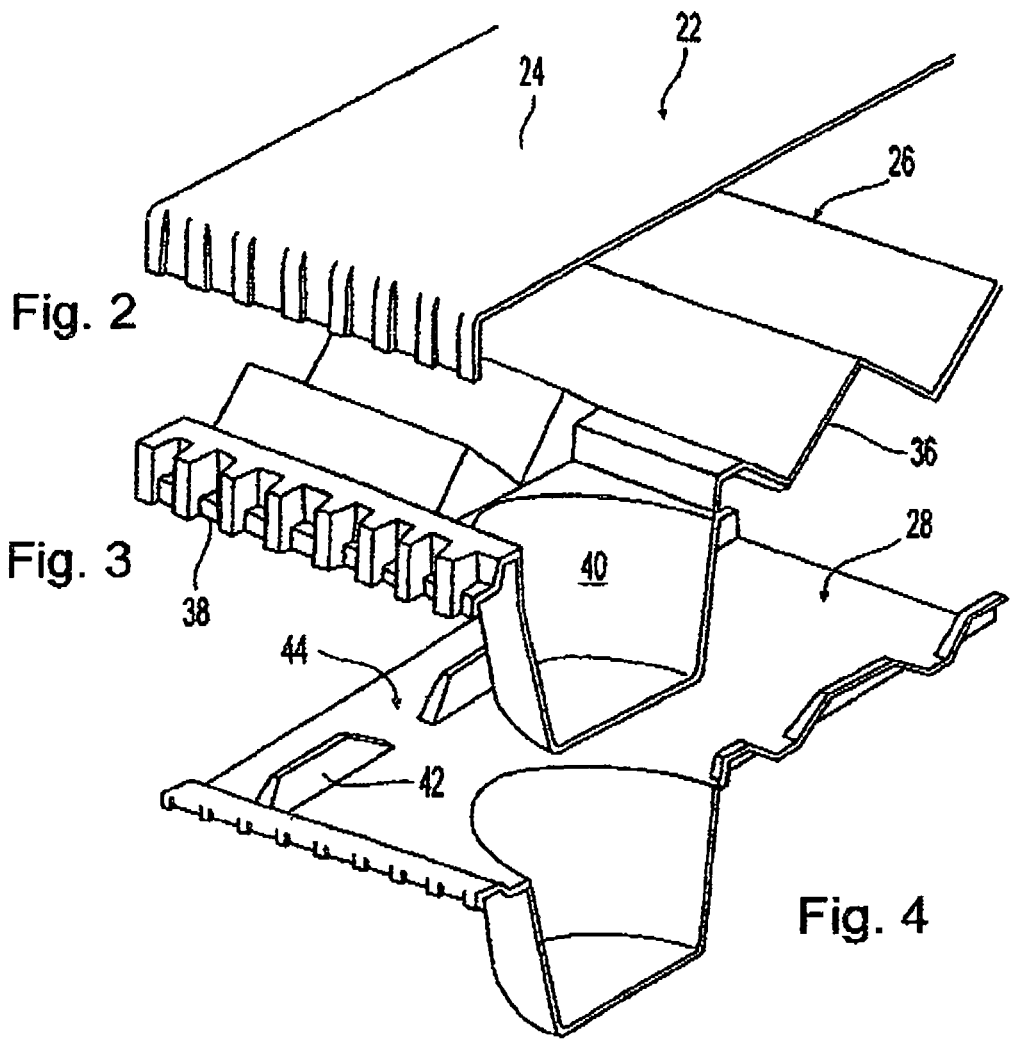
Fig. 2
Fig. 3
Fig. 4
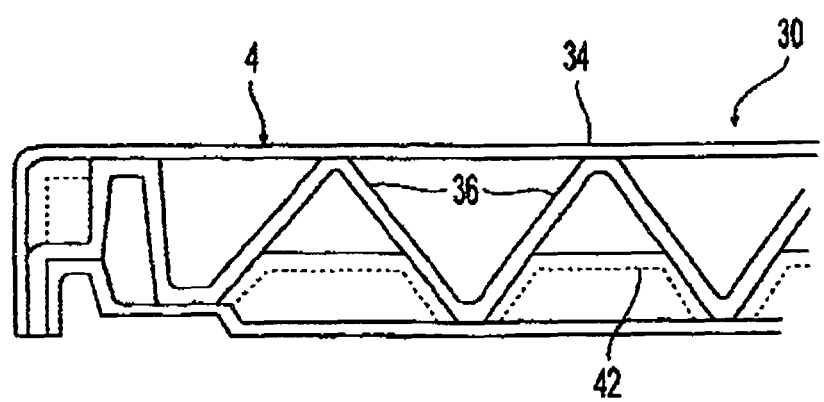
Fig. 5

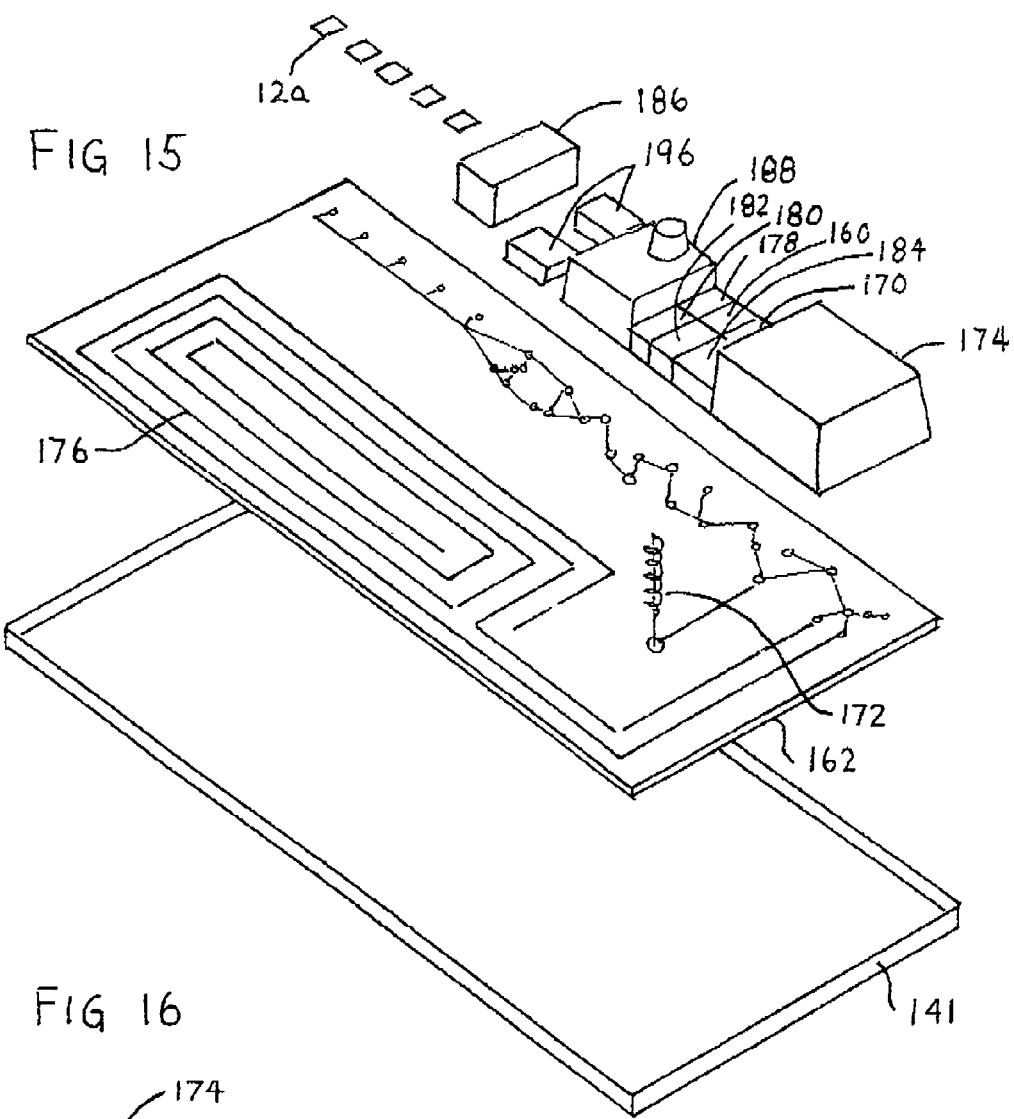
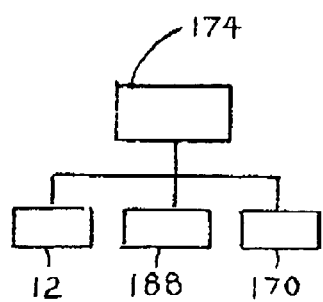

EMBEDDED RFID DEVICE FOR TRACKING A REUSABLE MATERIAL HANDLING DEVICE

CROSS-REFERENCE TO RELATED APPLICATIONS

This application is a continuation of pending U.S. patent application Ser. No. 13/068,943, which is a in-part continuation of U.S. patent application No. 11/981,091, now U.S. Pat. No. 8,077,040, which is a continuation of U.S. patent application Ser. No. 11/152,628, now U.S. Pat. No. 7,342,496, which is a continuation-in-part of U.S. patent application Ser. No. 09/770,097 filed on Jan. 24, 2001, now U.S. Pat. No. 6,943,678 which claims the benefit of U.S. Provisional Application No. 60/177,383, filed Jan 24, 2000. The disclosures of the above applications are incorporated herein in their entirety by reference.

FIELD OF THE INVENTION

This invention relates to an RFID device for tracking reusable material handling apparatus, and in particular to a label, tag or placard for use in the management of plastic pallets having cavities to receive said devices.

BACKGROUND OF THE INVENTION

Pallets are used to move products through supply chains and to store products between movements. Wood has been the preferred material of pallet construction. A number of standard pallet sizes, such as the Grocery Manufacturers Association ("GMA") style 48×40 inch pallet, have been used to facilitate the wide spread use of wooden pallets across differing distribution networks with some success. Such pallets are utilized in great numbers in what is known in industry as "pallet exchange". It is estimated that there are 2.2 billion wood pallets in North America.

Wooden pallets have problems. In particular, wooden pallets deteriorate with use and cause problems that add user costs. Fortune 500 companies that utilize large numbers of wooden pallets seek to overcome problems associated with deteriorating pallets by hiring wooden pallets from pallet rental companies. Pallet rental companies maintain large pools of wooden pallets and repair damaged wooden pallets before they are re-used. Large users of wooden pallets have therefore been able to manage their costs by transferring the burdens associated with wooden pallet deterioration and pallet exchange to other supply chain service companies.

Although the business model used by pallet rental companies has enjoyed some success, there have been problems. For example, it is difficult to keep track of wooden pallets after they are let for hire. Chep International, the largest pallet pooling company, reportedly lost 14 million wooden pallets, and booked a $238 million adjustment in its financial reporting. These pallet tracking and other inherent wooden pallet problems have increased the need to modify business models relating to the use of pallets for rental purposes.

For example, there are several business conditions and economic factors combined with a convergence of technologies that have led to the creation of track and trace technologies exemplified by the term RFID (radio frequency identification). RFID holds the promise of providing real time supply chain visibility so that in the first instance pallet rental companies would be able to track their rental assets and in the second instance so that pallet users could trace their product through the supply chain.

Implementation of RFID, in one respect, involves the attachment of a tag, which contains a unique identification code, onto a pallet and a distributed network of tag readers. The tag readers associate a tag with a known location to determine the status or progress of the pallet within the supply chain. In this manner, the pallet can be tracked and traced with some accuracy, and the status of the pallet can be queried and displayed according to well understood principles by industry.

Implementation of any RFID system is problematic with regard to wooden pallets. For instance, in U.S. patent application Ser. No. 10/701,745, which is assigned to Chep International, it is suggested that a tag can be positioned exteriorly upon a nine block GMA style 48×40 inch wooden pallet. Thus, as each tag is read its location would be known. There are however several problems with such an arrangement. In the first instance, it is known that wood absorbs liquid and liquids interfere with radio frequency signals. Therefore, the reliability of communication between the reader and the tag could be compromised by the wooden materials utilized in the construction of the pallet. In a second instance, a tag that is exteriorly positioned upon a surface of a wooden pallet would be subject to a high level of the wear and tear. The impact of a fork tine against an exteriorly positioned tag could result in the destruction of the tag and the loss of the data stored in the memory of the tag. In the final analysis, wood is not a suitable material for constructing pallets that must work within radio frequency rich environments.

As a result of some of the aforementioned circumstances and problems industry has attempted to utilize plastic materials in the construction of pallets. The replacement of wood with plastic has had some success but there have been problems associated with the use of plastic pallets that are to be used in association with track and trace technologies including RFID.

An early example of a plastic pallet that employees a data collection device (i.e. a tag) to provide a track and trace capability is described in U.S. Pat. No. 5,971,592 to Kralj et al. In this cited reference the data collection devices are contained in cavities located on each side of the four corners of the pallet. The apparent need for a tag in each corner is due to the short interrogation range of the readers of the day. In this arrangement a plurality of tags are required which would be more costly than an arrangement in which only one tag is required.

Similarly, in U.S. Pat. No. 6,199,488 to Favaron et al., a plastic pallet with two RFID cards (i.e. tags) is shown and described. The cards are positioned at angles and in the opposite corners so that at least one card is in communication range with a detector (i.e. a reader) from a side position (i.e. from a portal column or fork lift mounted reader). Although the Favaron et al. arrangement utilizes fewer tags than the Kralj et al. arrangement, Favaron et al. nevertheless utilizes more than one tag which is less economical than the use of one tag. A similar arrangement, requiring two or more tags, is disclosed in more thorough detail in U.S. Pat. No. 6,669,089, which was filed Nov. 12, 2001, and is assigned to 3M Innovative Properties Company.

Presumably, the arrangements suggested by Kralj et al. would be more reliable than the arrangement of application '745 because the devices of Kralj et al. are enclosed within the structures forming the pallet and therefore are less susceptible than exteriorly mounted tags to damage from fork impacts, wear and tear and the like. Furthermore, Kralj et al. would be more reliable than Favaron et al. because although Favaron et al. contemplates the containment of the tag within the body of the pallet, the Favaron et al. arrangement could allow liquids and other debris to penetrate into and accumulate within a socket wherein the tag of Favaron et al. is located. Liquids and debris within the socket could damage the tag or result in unreliable communication between the tag and the reader.

In U.S. Pat. No. 6,483,434, which is assigned to IFCO Systems, another pallet rental company, it is suggested that the delicate components of a transponder (i.e. a tag) can be protectively housed inside a plastic casing. The casing containing the delicate transponder could be subsequently positioned inside an injection mold and incorporated safely into an injection molded component forming part of a plastic pallet. This arrangement would protect the tags and overcome the problem associated with Favaron et al, wherein the tags are indirectly exposed to wear and tear.

Although the arrangements encasing the RFID tags within the plastic pallet embodiments cited above offer levels of protection superior to the method of application '745, such arrangements nevertheless have additional problems. In particular, in order to remove, replace or repair the tags of the prior art references, the plastic pallets themselves would have to be deconstructed or destroyed to provide access to the tags. Accordingly, the prior art does not contemplate an efficient means to either replace defective or damaged tags or to upgrade long lasting plastic pallets with new tags incorporating enhanced capabilities as these become available. It should be noted that a plastic pallet can have a life span of +/- ten years, which length of time may easily exceed the lifecycle of a deployed RFID technology.

In U.S. Pat. No. 6,814,287 to Chang et al. a pallet apparatus equipped with a radio frequency recognition module is described. In a first wooden pallet embodiment the module comprises a molded cup forming a compartment that receives a tag. The cup is covered by a cap to enclose the tag inside the compartment. The module is inserted into a cavity formed in a block or stringer of the wooden pallet. In a second plastic pallet embodiment, the module comprises a removable clip for holding a tag and the clip attaches to the exterior of the plastic pallet. Both embodiments provide an efficient means for accessing a tag without deconstructing or destructing the pallet itself. However, in both cases the module could become detached from the associated pallet resulting in the loss of data and possibly the pallet.

In the above cited references two or more tags are suggested so that information can be obtained from at least one tag. However, in order to write information into the two or more tags, the tags would have to be synchronized with one another. This adds complexity to the implementation of RFID methods and systems. When only a single tag is attached to one side of a pallet, the pallet itself could become an obstacle. In this case the pallet would need to be rotated so that the pallet side with the tag faces the reader. Rotating the pallet is time consuming.

Accordingly, it has been suggested that a tag can be positioned substantially in the center region of the pallet. For example, publication document Netherlands 9401836 proposes locating a tag in the center of a pallet and mounting readers on the tines of a fork lift to enable the reader to communicate with the tag. This arrangement is not amenable to reading the tag from the side through a portal mounted reader. For example, the metal tines could block signals intended for the tag. In U.S patent application Ser. No. 10/962,574, a preferred embodiment involves forming a through hole penetrating from one to the other side of the pallet, and positioning a tag inside the through hole in the vicinity of the middle of the pallet. The through hole is characterized as a transmission pathway for radio frequencies traveling between the tag and the reader. One problem with application Ser. No. 10/962,574 is that the through hole could collect debris that could impair the operability of the tag.

As discussed above, the life cycle of a plastic pallet may exceed the useful life cycle of a tag technology. Therefore, it would be advantageous in the adaptation of the plastic pallet to anticipate replacement of earlier tags with technologically up-dated tags. In U.S. Pat. No. 6,844,857, assigned to Linpac Moulding, it has been suggested that a recess, provided with a cover, could be developed to enable the removal and exchange of a circuit (i.e. tag IC) to program the circuit with current data or to exchange the circuit in the case of damage or malfunction or to update tag technology. Although the arrangement does not contemplate the destruction of the plastic pallet to access the tag IC, the recess of U.S. Pat. No. 6,844,857 is not developed to accommodate more than one tag IC at a time. This is a problem because there is a need to provide pallets with a plurality of tags so that the pallet can function across non-interoperable RFI D systems existing within the supply chain.

In U.S. Pat. No. 6,816,076, assigned to Allibert Equipment, the advantage of providing a plastic pallet with a tag holder (i.e. a recess) is offered. The tag holder is an open design and provides an easy way to change a tag. The carrier (i.e. pallet) disclosed in U.S. Pat. No. 6,816,076 also contemplates the use of first and second tags involving a relay relationship, in which the antenna of the second tag is operable to increase the read range of the first tag. Such an arrangement is impractical because the first tag incorporated into the plastic pallet that contains the unique pallet ID becomes redundant once the unique ID of the first tag is associated with the unique ID of the second tag.

What is needed is a plastic pallet that is adapted to operate in a radio frequency rich environment. In particular, the pallet must be able to protect RF devices from wear and tear. Where practical, only one tag indicative of a first characteristic should be required, not two tags as is known in the art. The pallet must also provide access to the devices for any number of purposes as would be anticipated in the art.

SUMMARY OF THE INVENTION

In accordance with the present invention a pallet is provided that is amenable to operating in an RF-rich environment. Towards this end the materials utilized to construct the pallet comprise materials that are substantially transparent to RF signals so that RF signals may pass through the materials utilized to construct the pallet.

It is another object to provide a pallet product with multiple unique identification codes so that a plurality of components each with individual IDs can be combined to form a single product entity having its own unique product ID. This aspect allows a variety of parties to enjoy multiple levels of product identification.

It is another object to provide the pallet with at least one compartment to accommodate identification devices therein. According to this aspect, in one embodiment, the compartment is created as part of the pallet structure and is located in a position that enables the compartment to occupy a large space to accommodate at least one large identification device.

It is another object to provide an identification device that takes advantage of the large size of the compartment of the pallet. Toward this end an identification device comprising a folded article is inserted into the pallet cavity. The folded article is made from a flexible substrate or lamination of material with an in-layed integrated circuit and an antenna. The tag, label or placard material with the RFID components is scored, die cut and later assembled or disassembled using integral interlocking tabs. The folded article occupies three RF planes when inserted within the compartment to communicate with external RF apparatus positioned adjacent said pallet. In another aspect the multi-planar device is also multi-modal such that the device operates electromagnetically and electrostatically. In another aspect the multi-planar device is multi-band such that the device operates at different frequency bands, used within the supply chain.

It is another object to provide a pallet that accommodates identification apparatus that omits a distributed network of reader devices to facilitate communication between a pallet ID device and a remote host. Toward this end a pallet includes an apparatus populated with at least one of a cellular communications module, a GPS communications module, a Bluetooth communications module, a LAN communications module, a PCS communications module, an interrogation module or any other wireless communications means module as may be anticipated looking forward into the future wherein apparatus is provided to enable close range (up to 10 yards), intermediate range (up to 300 yards) and long range (to several miles) air interface communications without relying upon cable or wire connections. In still further connection with this aspect, a pallet is provided that couples said wireless communication devices, including RFID tags and the like, with sensors to monitor conditions indicative of at least one particular external environmental factor.

It is another object to provide a pallet that includes an RFID reader/writer interrogator for reading and writing to external RFID beacon tags, internal RFID pallet tags and RFID item tags carried by the pallet. The RFID reader/writer interrogator is integrated with one or more communications modules for communicating out of RFID range with pallet management entities. The RFID reader/writer interrogator includes an antenna arrangement having a signal pattern directed to a transporting and storage area for containing the articles with attached RFID item tags to maintain a real-time manifest of pallet inventory. The pallet's RFID reader/writer interrogator is configured to be responsive to the addition and removal of articles with attached RFID item tags upon the load-bearing surface of the pallet. The RFID reader/writer interrogator is additionally communicatively coupled to RFID pallet tags for the purpose of obtaining RFID pallet tag data to which the system is responsive. The RFID reader/writer interrogator includes further antenna arrays for communicative coupling with RFID beacon tags positioned along the distribution path of the pallet. RFID beacon tag data obtained by the pallet's RFID reader/writer interrogator is aggregated with the data obtained from the RFID item tags and RFID pallet tags and packaged for communication via the one or more communications modules to the pallet management entities.

It is another object to provide the pallet with a power resource for autonomous operation. Towards this end a power supply is used to provide power to the components of the pallet apparatus. The power supply can include a battery, a rechargeable battery, and a renewable power supply that optionally rectifies voltage generated by antenna coils into stored energy or an electro-mechanical device that develops storable energy when the pallet is agitated by movement. The power supply is a power resource for active RFID pallet tags, the RFID reader/writer interrogator and the communications modules of the pallet apparatus.

It yet another object to remove electronic equipment from the cavities in the apparatus, so that the apparatus itself is 100% recyclable. During use of the apparatus, the electronic equipment will have to be removed from time to time from the cavity in order to replenish the power or upgraded the different communications devices, sensors, micro processors and RFID devices including folded article, resident within each cavity.

BRIEF DESCRIPTION OF THE FIGURES.

The foregoing and other features and advantages of the present invention will be more readily appreciated as the same become better understood from the following detailed description when taken in conjunction with the accompanying drawings, wherein:

FIGS. 2 3 and 4 represent an exploded sectional view of deck structure of the pallet indicated at the position 20 of FIG. 1;

FIG. 5 is a side elevation view of the deck structure of the pallet showing the three sheets of a preferred embodiment;

FIG. 15 is an exploded perspective view of the electronic equipment inside the upper compartment of the pallet shown in FIG. 13.

FIG. 16 is a schematic showing the RFID pallet tag, RFID reader/writer interrogator and communications modules receiving power from the battery and power resource.

DETAILED DESCRIPTION

Figure 1:
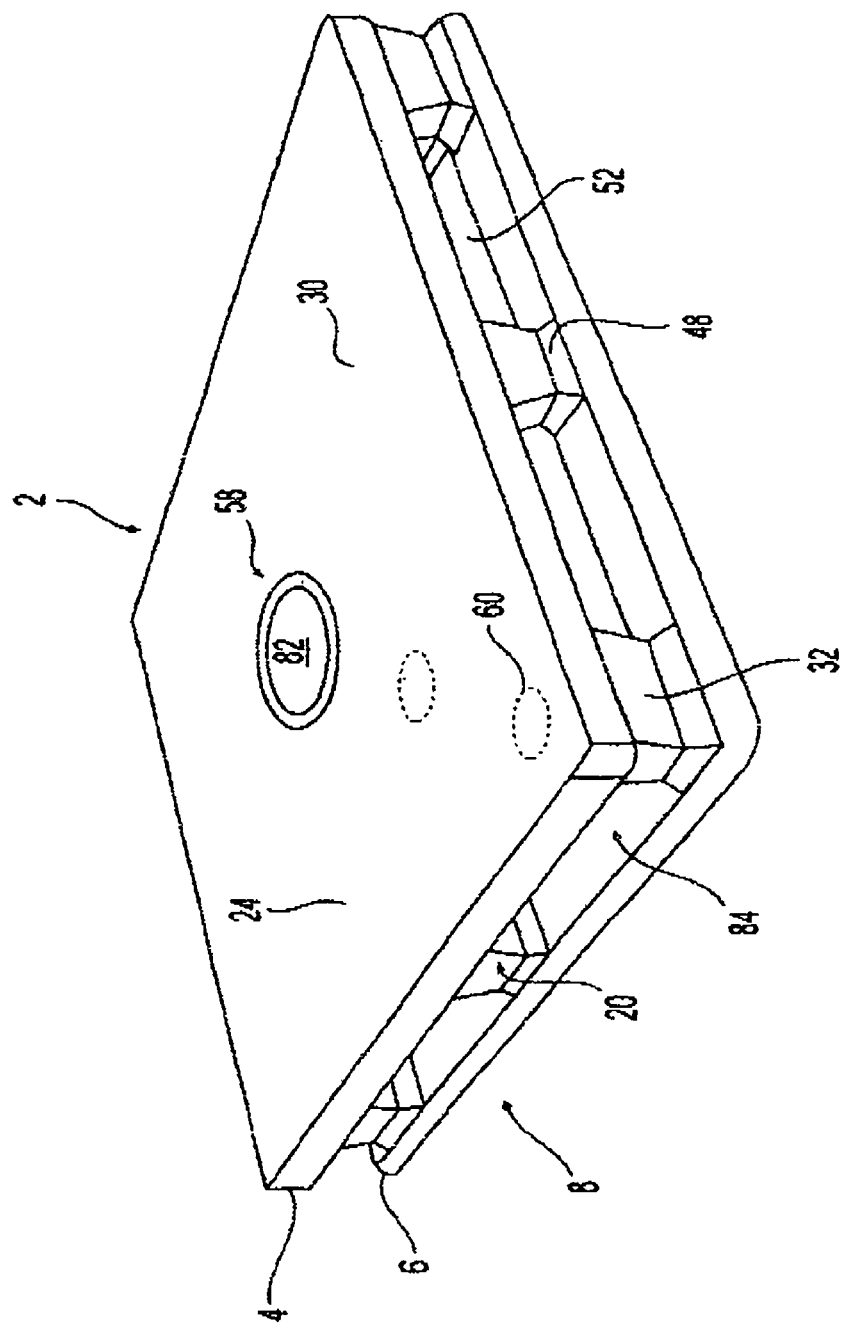
FIG. 1 is a perspective view of a GMA style 48×40 inch pallet including a compartment in the deck structure.

The present embodiments of pallet structures are merely representative of the principles of the invention and are not intended to limit the scope of the invention or application and uses of the invention. Furthermore, there is no intention to be bound by any expressed or implied theory presented in the preceding technical filed, background, or brief summary of the following detailed description. For example, the pallet structures can be made of any plastic, wood, metal, cellulose material or combination thereof. The pallet structures may be injection molded, blow molded, compression molded, differential pressure formed, stamped, die-cut, fabricated and assembled, welded, and bonded together. The pallets can take the form of GMA style 48×40 inch pallets, nine-legged nestable pallets, shipping trays, returnable dunnage and the like. Other products falling within the scope of the invention include IBCs, RPCs, ULDs, fuel tanks and the like.

One preferred embodiment involves exemplary pallet structure 2 comprising a combination of plastic forming techniques as will be described below. Further, the present exemplary pallet structure is in the form of a GMA style 48×40 inch pallet. By way of description the GMA style pallet has the specifications listed below:

1. Exact 48-inch×40-inch dimensions. Square in each direction.
2. True four-way entry. Capable of accommodating existing pallet jacks from all four sides (as opposed to current style with cutouts and stringers).
3. Minimum-width pallet jack openings of 12 inches and minimum height of 3¾ inch clearance when under load. Width of each center support must be less than six inches to accommodate pallet jacks.
4. Smooth, non-skid, top-bearing surface should have at least 85% coverage. However, 100% is preferred. Non-skid surface should be flat, or have no indentations or protrusions that could cause product damage.
5. Bottom-bearing surface of no less than 60% coverage with properly placed cut-outs (12-inches square) for pallet jack wheels from four sides. Surface should be flat or have no indentations or protrusions that could cause product damage.
6. All bottom entry edges should be chamfered to ¼-inch for easy entry and exit.
7. Overall height of platform should not exceed six inches.
8. Rackable from both the 48-inch and 40-inch dimensions. Allowable deflection in drive-in and drive through racks no more than ½ inch.
9. Compatible with pallet conveyors, pallet dispensers, skate-wheel pallet-flow racks, and automatic storage and retrieval systems.
10. No protruding fasteners.
11. Must be made of material that does not contaminate the product it carries.
12. Must meet or exceed current pallet resistance to fire.
13. Must be recyclable. Preferably made of recycled material.
14. Desired weight under 50 pounds.
15. Load capacities of 2,800 pounds. Capable of bearing 2,800-pound loads safely in stacks five loads high.
16. Repairs should be economically feasible.
17. Weather resistant.
18. Moisture resistant.
19. Capable of safely moving product, damage free, through the entire distribution channel with multiple cycles (from manufacturer through distributor to retail).

The exemplary pallet structure of the invention comprises two parts including a deck 4 and a base 6. Together the deck and the base form the GMA style pallet 8. The pallet structure 2 contains at least one identification device 10, for example a radio frequency identification device (RFID) 12 or a surface acoustic wave (SAW) device 14, although the one identification device may be any one of a tag, a capsule, a label, a printed circuit board (PCB), and the like that communicates wirelessly without limitation by employing antennas instead of cables. Preferably a first device 16 identifies the deck and a second device 18 identifies the base. Preferably each part (i.e. the deck and base) is given a unique identification, and this ID record is indicated by the two respective identification devices 16 and 18. The parts are combined to create one product 8. The one product is also given a unique identification distinct from the IDs of the associated parts. Therefore, the pallet 2 has a plurality of IDs, and in the present case three: a first ID for the deck, a second ID for the base and a third ID for the combination product.

The IDs of the exemplary pallet are characterized as first level IDs, second level IDs, third level IDs and so on. In the present case the two part IDs are level one IDs, and the one combination product ID is a level two ID. By way of example, a pallet, with ID number 1006, is associated with the combination of deck, with ID number 101, and base, with ID number 203. Unique pallet ID number 1006 expires when the association of ID numbers 101 and 203 ends. The association ends for example when the deck is reconfigured with a new base, providing a new (up-graded or customized) product. A new unique second level ID is given to the new combination product when the new association is made.

Preferably, both the first and second level IDs are evident in each identification device utilized in each part. In other words, each identification device contains code space for at least two IDs. However, when a product involves only one part the device can have a non-volatile memory or record, therefore getting by with only one unique ID. Such a case is only exemplary.

A pallet may also require a unique third level ID as discussed below. In one scenario the pallet is made by a first company and sold to a second company. The second company utilizes the pallet for internal use i.e. closed-loop purposes. The first company (i.e. the manufacturer) will have a permanent record of a production date, performance specification and material content in the unique first and second level IDs of the parts and product, respectively, sold to the second company. The second company (i.e. the end user) will know at least the second level ID for warranty purposes and the like should the second company return the pallet to the first company for recycling and the like. The second company will also have a dynamic record of the status associated with at least the second level ID or another third level ID if the second level ID is not interoperable within the end user's operating environment (in other words the end user may place another ID device inside the pallet, the second device operating in another mode or frequency band than the first). Therefore, the second company may use a third level ID to associate the pallet within its deployed track and trace system. In a second scenario the manufacturer sells the known parts and product to a second party that leases the product to third parties. A third party may require a unique third or fourth level ID to indicate a customized characteristic indicative of the product. For example, a third party may monitor external temperature to know the shipping status of a unit load. The information indicative of temperature is associated with a unique third or fourth level ID that is distinct from the first and second level IDs associated with the parts and pallet product. Hence, a pallet product may have a plurality of unique IDs.

Therefore, one now appreciates that a pallet must be configured to comply with the GMA performance specifications while at the same time interoperating within a variety of RF-rich environments.

For this purpose the exemplary pallet of FIG. 1 is suggested. Pallet 2 is known as a GMA style 48×40 inch pallet 8 and complies with all 19 GMA performance specifications listed above. Pallet 2 comprises a deck part 4 and a base part 6. The deck and base snap together to provide a single pallet product 8.

Although the deck and base can be constructed utilizing any combination of materials and formed using any forming technique, the preferred structure is primarily based upon differential pressure forming, which is some times known as thermoforming or vacuum forming. In the present case, the deck and base are thermoformed according to the triple sheet method, but twin sheet forming can be used with satisfaction. Both thermoforming arts are known in the patent record.

Triple sheet is preferred over twin sheet for several reasons, which would be known by referring to co-owned U.S. Pat. Nos. 6,749,418 and 6,718,888. Referring now to FIGS. 2, 3 and 4, a section 20 of deck is seen comprising three sheets of molded plastic. A top sheet 22 provides a flat surface 24 to provide up to 100 percent surface coverage for supporting unit loads thereon (not shown). A middle sheet 26 and a bottom sheet 28 together provide a load bearing platform 30 and a plurality of double walled leg pockets 32 that support the platform above the base, to allow for the introduction of fork tines, pallet jacks and the like, which are used to move the pallet. The leg pockets 32 may be rectangular, square, round or oval in shape. The structure of a triple sheet configuration results in a hybrid honeycomb arrangement that yields a stronger strength to weight ratio than a twin sheet structure using an equivalent measure of plastic material. Furthermore, the method is preferred because sheet 22 provides a flat load support surface 34 while the two other sheets 26 and 28 form a rigid platform 30 and double walled leg pockets 32 (a twin sheet structure would have less than 100 percent surface coverage if the top sheet was deformed to provide double walled legs and therefore could not comply with specifications 4 and 15 simultaneously). Double walled legs support a higher static load than a single walled leg using the same measure of plastic. A higher strength to weight ratio is preferred for familiar economic reasons.

The present embodiment of triple sheet deck is preferred because the added strength of the structure allows the thermoforming practitioner to utilize an all plastic material combination rather than two sheets of plastic plus captive crossmembers that would be required to add strength to comply with specification 8 for rack strength. All plastic is preferred because some materials used to construct the cross members may block or interfere with the transmission of RF signals. The cross members also add cost and complexity to the making, maintenance and recycling of the pallet structure.

Figure 6:
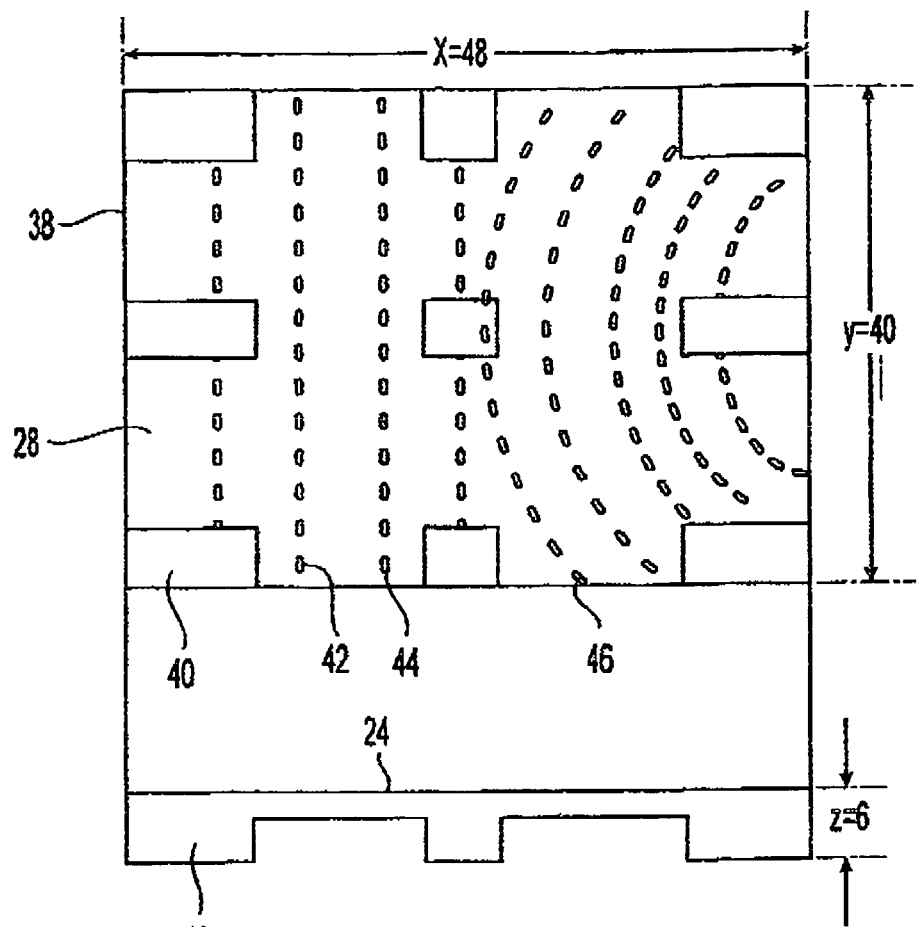
FIG. 6 is a plan view showing the underside of the deck structure and a side elevation view showing the deck structure from the 48-inch side of a pallet.

In the present exemplary case the middle sheet incorporates a series of angles 36 arranged in the 48 inch direction of the 48×40 inch deck, although the angles can be arranged in the 40 inch direction with satisfaction. The angles extend between and fuse to the top sheet and the bottom sheet in a repeating manner between the opposed sides 38a and 38b that are 40 inches apart, and thus maintain the top sheet and the bottom sheet a fixed distance apart (+/−1.5 inches). There may be as many as 80 angles or as few as 20 angles extending from side to side in a 48×40 inch pallet foot print. The angles are interrupted in nine locations 40 designated for leg pockets, although any number of leg pockets or parallel runners falls within the scope of the invention. The bottom sheet incorporates a series of rigidifying blocks 42 that are positioned in line 44 to restrict the angles from bending, like an accordion, when the structure is loaded. The blocks may be short or tall, extending less than or the full height of the angles. The blocks are further aligned as suggested in FIG. 6, so that the blocks create an in-line ribbed structure 46 adding additional reinforcement substantially perpendicular to the stronger 48 inch direction (i.e. in the 40 inch direction).

Although angles 36 are preferred, any rigidifying methodology may be used with satisfaction. The angles are preferred because they are shown to provide the best strength characteristics, as would be known by referring to an article entitled "Plate-Stiffening" written by K. Lowenfeld, published in Der Maschinenmarkt (Wurzburg, Germany), which is incorporated hereunder by such reference.

The base is also constructed according to the triple sheet method, although twin sheet can be used satisfactorily. The base is joined to the deck at a leg interface 48 by a snap fit arrangement 50. The base includes 4 square cutouts 52 that are intended to accommodate the wheels of a pallet jack or the like, which move the pallet.

Figure 7:
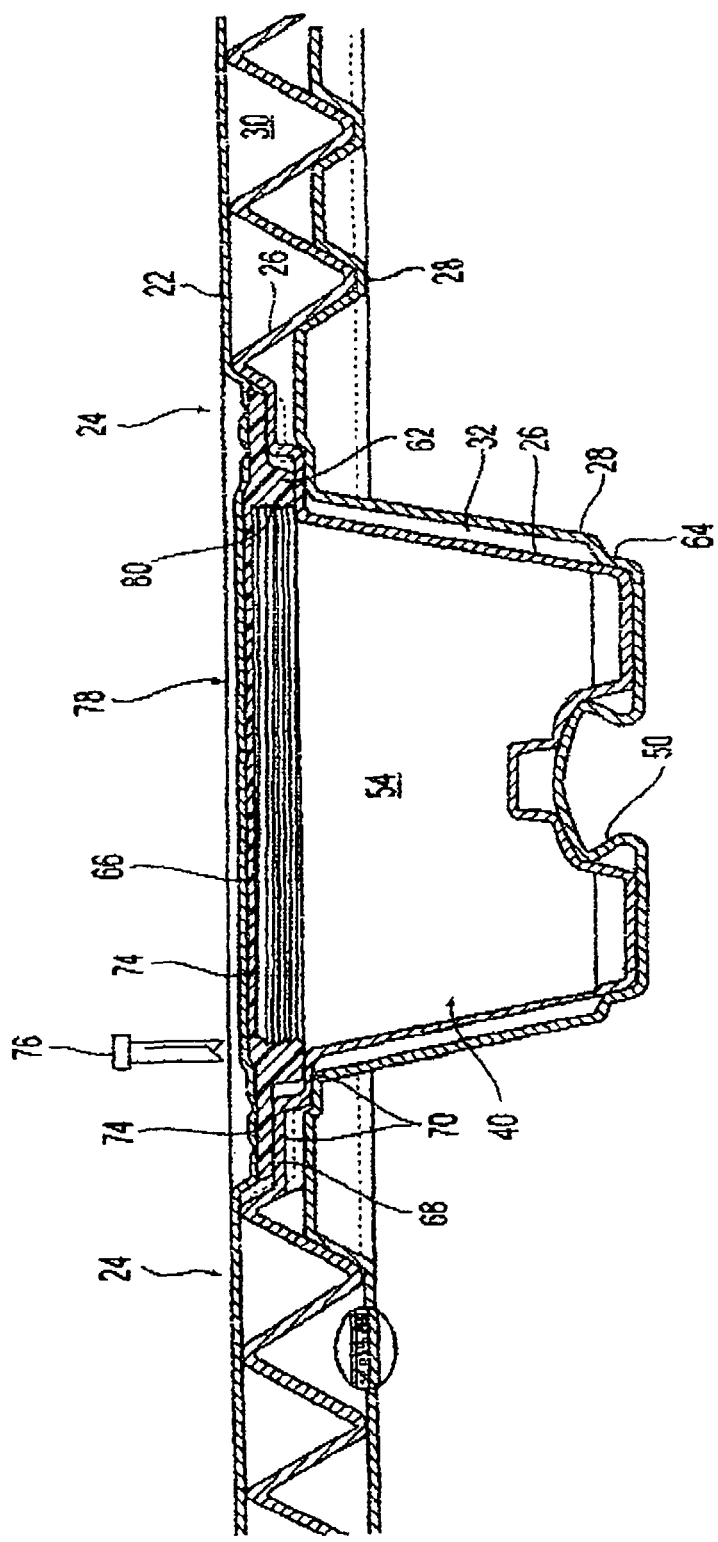
FIG. 7 is a side elevation section of the deck taken from the center region of the pallet.
Figure 8:
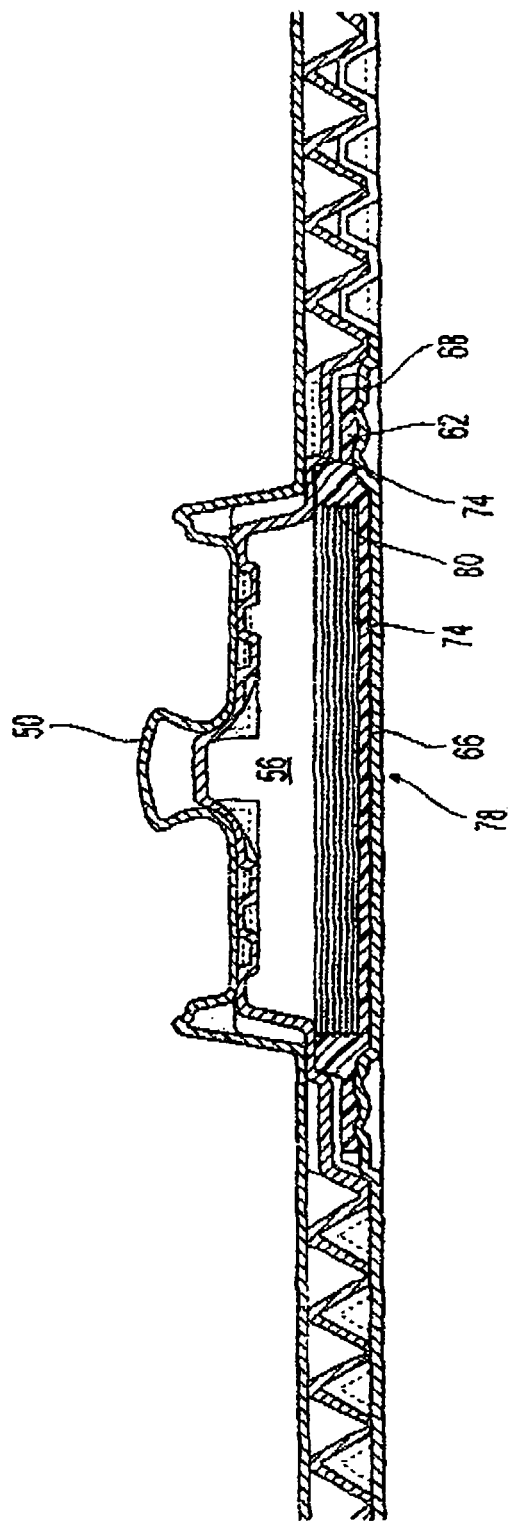
FIG. 8 is a side elevation section of the base of the pallet of FIG. 1 taken from the center region of the pallet.

As indicated in FIGS. 7 and 8 the deck and base of the exemplary GMA style pallet is adapted for operation in an RF-rich environment. In particular, the deck and base incorporate compartments 54 and 56 respectively, and the compartments are adapted to receive and enclosed electronic devices as will be described later.

With respect to compartments 54 and 56, it will be appreciated that the compartments are situated in the location of the center region 58 of the pallet structures, although one or more compartments may be formed in another location 60 corresponding to any one of the nine legs (i.e. in any deep structures) of the exemplary pallet. Additionally, compartments may be formed in locations between the leg pockets, depending upon the preferences of the practitioner. For example, if the pallet embodiment is a nesting style pallet in which case the legs inter-nest for consolidated shipment and storage, the compartment can be incorporated on a top or bottom surface of such a pallet embodiment.

It will also be understood by those familiar with the art of thermoforming that the threaded aspects 62 of the compartments can only be provided through novel intervention as will be described in reference to an exemplary triple sheet molding methodology. With respect to the deck, it should be known that the preferred thermoforming arrangement is one in which the bottom sheet 28 is first formed over a first mold (and the second mold is used as a plug-assist to help form the exterior leg structure 64 of the deep leg pocket having an approximate +/−4:1 draw ratio). Next the middle sheet 26 is formed over a second mold having deep leg pocket portions (not shown) in order to allow the cantenary effect of the heated sheet 26 to benefit the forming thereof. After the first and second sheets are thermoformed they are brought together in a twin sheet phase and compressed together by opposed platens between the first and second molds to make a twin sheet sub-assembly (not shown). The twin sheet sub assembly is extracted from the sheet line when a lower platen carrying the first mold is lowered to make way for the third sheet that is thermoformed over a third mold suspended from a top platen in a position parallel and vertically aligned with the first platen. When the twin sheet sub assembly is in the extracted position a shuttle apparatus known in the art delivers an injection molded insert 66 to a selected location 68 and deposits the insert onto the middle sheet, where formed details 70 of the middle sheet retain the insert in a fixed location upon the twin sheet sub-assembly. (The insert is not limited in size in the 48 or 40 inch directions.) After the third sheet is thermoformed over the third mold the first platen extends upward into the sheet line where after the twin sheet sub-assembly is compressed against the third sheet between the first and third molds to form an instant triple sheet assembly 72. During the "triple sheet" phase the heated third sheet and heated second sheet are caused to fuse to the exterior surfaces 74 of the insert. The insert is thereby incorporated into the triple sheet assembly. After the triple sheet assembly is extracted from the thermoforming machine a trimming router or the like removes a section 76 of material of the third sheet to provide a compartment opening 78, thereby exposing threads 80 formed in the insert, which threads are adapted to receive a cover 82 as will be described later.

It should be noted that the exemplary insert can be incorporated into a triple sheet, twin sheet or single sheet article. Furthermore, the exemplary insert can be incorporated interiorly (as shown) or exteriorly, depending upon the preference of the practitioner. The insert can involve threads positioned annularly on an inside (as shown) or outside surface, and the threads can be substituted with any structure that will receive and retain with security a removable cover in place to enclose the compartment.

In the present exemplary pallet the compartment is formed in the center region of the pallet so that identification and other electronic devices situated within a respective compartment thereof are substantially equidistant from a device reader positioned adjacent the pallet, for example a hand held, portal or fork lift mounted reader Furthermore, the compartment is formed in the center region of the exemplary pallet because the deep leg pocket structure of the pallet affords more space for the compartment than would be the case if the compartment where located in a position between the leg pockets. GMA specifications call for a deck 4 thickness of 1.5 inches, a base thickness of 0.75 inches and an overall pallet height of 6 inches. This provides a fork lift opening 84 between the deck and base of 3.75 inches, allowing a maximum 0.250 inch for deflection to remain within GMA tolerance. Therefore, the deck and base structures of a GMA type pallet do not have the thickness to allow for a deep compartment. By developing a compartment in the legs of a pallet the compartment can be considerably larger allowing for the use of larger identification devices and even a plurality of devices, as will be described later.

Therefore the leg pockets are utilized to increase the size capacity of the compartment. In the present embodiment, the depth of the compartments 54 and 56 of the deck and base are 4 inches and 1.5 inches, respectively. A compartment formed otherwise in the platform section of the deck would be +/−1.25 inches in depth, and a compartment formed in the base would be +/−0.5 inches, while allowing for the thickness of the pallet material.

It is advantageous to provide a large compartment because there is a need to accommodate at least one large ID device plus other devices and sensors as will be described below.

Tags communicate with a reader through an antenna. Tags exist in all forms, shapes and sizes. A number of factors determines the form, shape and size of the antenna, whether it is a small (postage stamp) planar antenna, a small capsule or cylindrical antenna, a label antenna of any type, a printed circuit board, a formed (helical, notched) aerial antenna and the like, as well as passive, active or active/passive antenna. Any combination and variety of antenna, whether deposited on a carrier or formed from a conductor can be accommodated within the compartment. The antennas can also be orientated vertically, horizontally, or diagonally with respect to the reader's signal pattern, broadly interpreted.

Therefore, the compartment should be as large as possible to accommodate a wide range of antenna in a number of different orientations suitable for tag to reader data exchange.

For example, Ultra High Frequency (UHF) (e.g., 915 MHz, 2.45 GHz) electromagnetic tags are preferred in association with pallets because of their relatively long range abilities. Lower frequency (e.g., 125 kHz, 13.56 MHz) electrostatic tags are preferred for close range inventory or shelving applications requiring good signal carrier reflection. However, all frequency bands and modes of operation (i.e. electromagnetic, electrostatic, acoustic) are intended to be used by any possible identification device that may be located in the compartment in order to monitor the pallet and its unit load through all stages of the disparate supply chain.

Lower frequency antennas are comparably large in relation to UHF antennas. Low frequency tags are characterized by label style structures in which a low conductivity ink may be applied to a lower cost substrate to provide a planar antenna that is non-resonant. Such a tag antenna may, by way of example only, be 2×2 inches in size and less than 1/32 inches in cross section. Furthermore, when the low frequency tag antenna is increased in size the range typically increases. Therefore, the larger the compartment, the larger the antenna that can be protectively accommodated inside the pallet, and therefore the greater the tag read range. Increased read range is regarded as beneficial in most cases.

Furthermore, it is known that when the conventional antennas of the reader and the tag are perpendicular to the direction of the signal that there is more effective communication there between the two. Therefore, the tag antenna structures may preferably occupy designated space inside the compartment to facilitate a preferred reader to tag orientation. In association with this requirement, one low frequency tag may contain three antennas in three orientations, as will be discussed below.

Readers 86 may be fixed, mounted or hand held. In a first setting there may be a portal arrangement in which the reader comprises a reader antenna array 88a situated on vertical column. A preferred tag antenna orientation 92 for this setting would be vertical. In a second setting the reader antenna array 88b may be situated above or below the path traveled by the tag, and the favored tag antenna orientation 94 would be horizontal. In a third setting the reader antenna array 88c is mounted on a fork lift, and the preferred vertical tag antenna orientation 98 may be perpendicular to vertical orientation 92. In order to facilitate the full range of preferred tag orientations 92 94 and 98 it may be necessary to rotate the pallet 90° in order to provide proper orientation in any of the three settings suggested. Alternatively it may be helpful to provide a tag that is best orientated parallel to the direction of the signals, as is known in the art in connection with RFID systems for books, file folders and the like. As this extra work or correction would be inconvenient and slow the pace of the pallet's movement through the supply chain an antenna 100 can be segmented into three sections 102, 104 and 106 such that the tag substrate is folded as indicated at 108, along creases 110. Additionally, the tag may be structured so that on each of the three surfaces there is, by way of example only, a multi-frequency antenna array 112a, 112b and 112c, comprising a low frequency antenna 114 and high frequency antennas 116 and 118. The three antenna arrays 112 are connected to a tag module indicated 120 including at least an IC to provide a unique ID and circuitry for coupling the antenna arrays 112 with a wide range of readers and reader positions as the pallet moves throughout the supply chain. Therefore to insure the pallet is able to move through different settings it would be important that the compartment facilitate a number of larger rather than a smaller antenna and orientations (i.e. "X", "Y" and "Z" planes) of the present invention.

By way of further explanation, the antenna arrays 112 can be sub-divided further into discreet antenna structures such that the antenna structures on each surface can communicate within different frequency bands, such as with a dipole antenna wherein one pole 116 resonating at 915 MHz communicates with a first reader and a second pole 118 resonating at 2.45 GHz communicates with a second reader. In this fashion the tag can be developed to communicate with a plurality of readers distributed throughout the supply chain.

Figure 9:
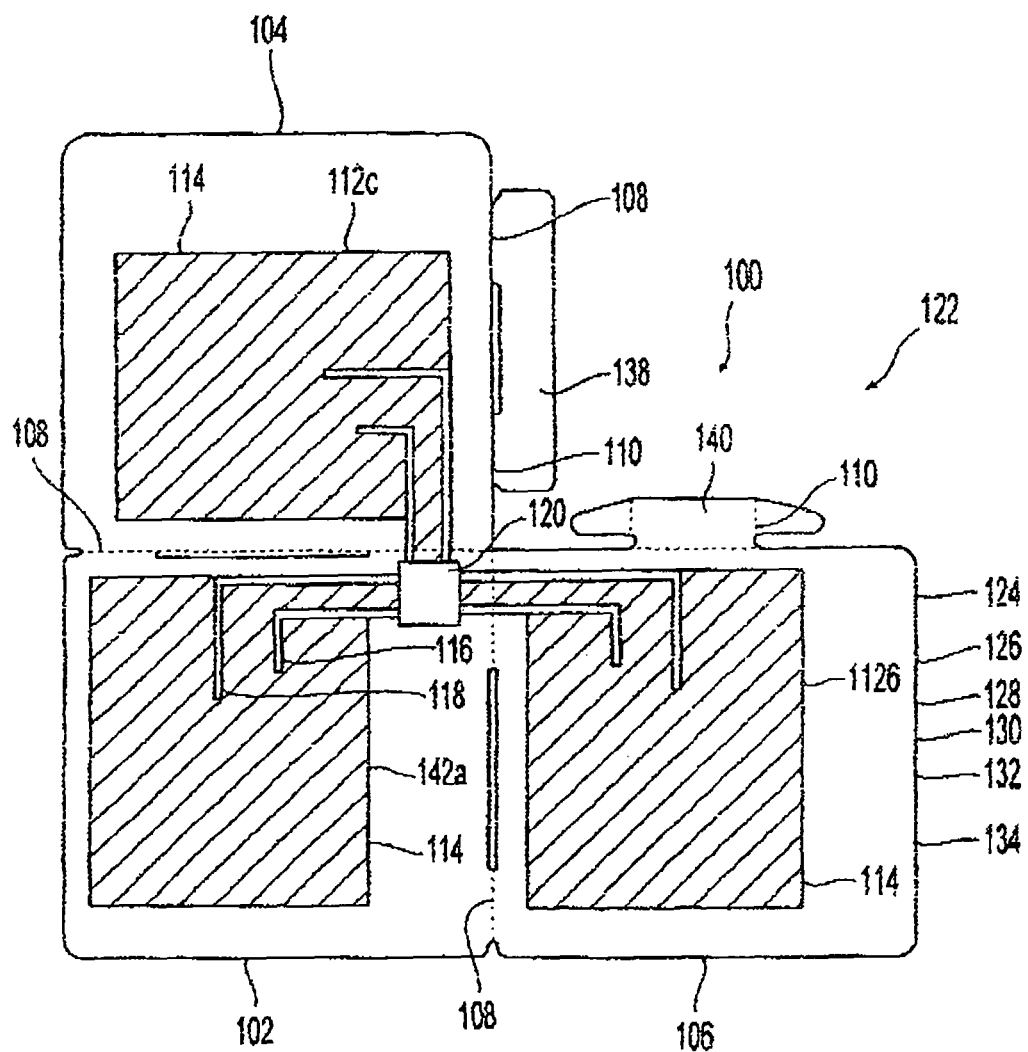
FIG. 9 is a plan view of one embodiment of an RFID tag comprising three sections and showing within each section a plurality of antenna structures.
Figure 9A:
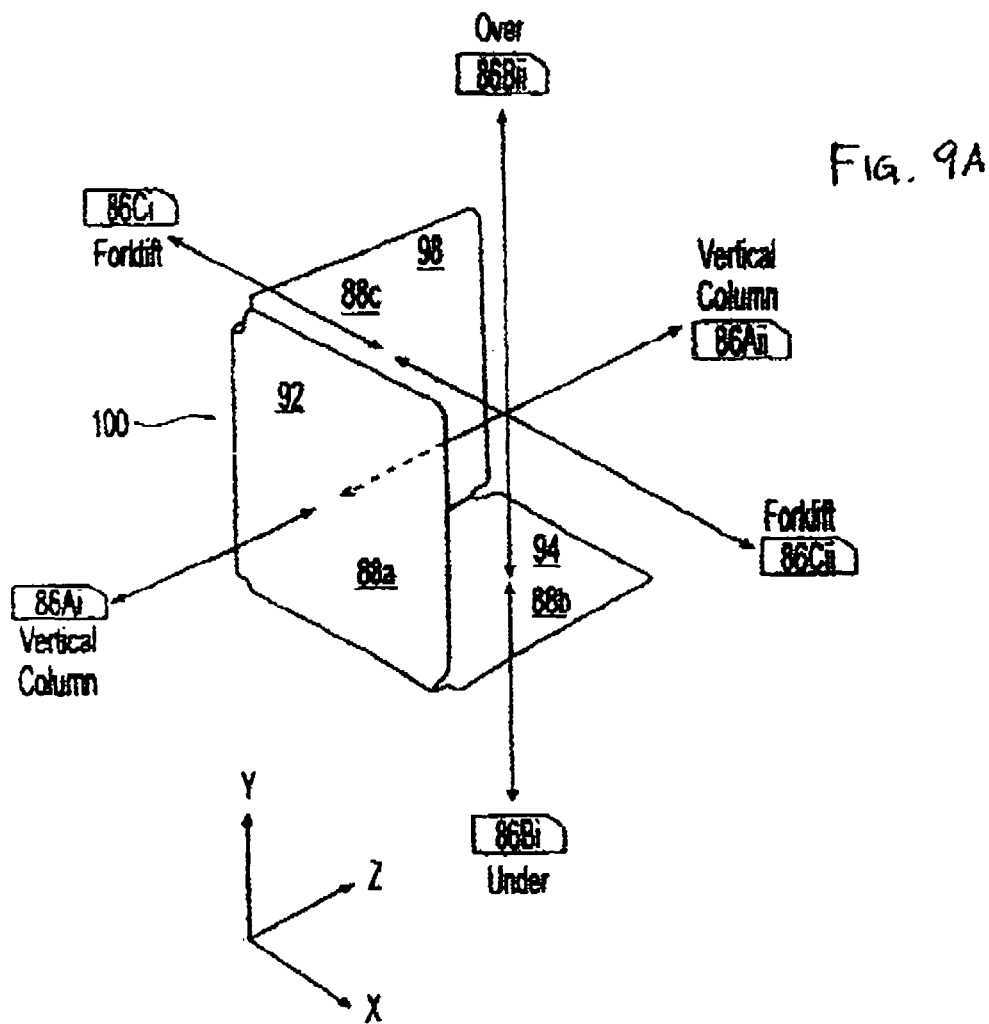
FIG. 9A is a perspective view of the RFID tag in FIG. 9 assembled for use inside a pallet cavity for radio frequency communication.
Figure 9B:
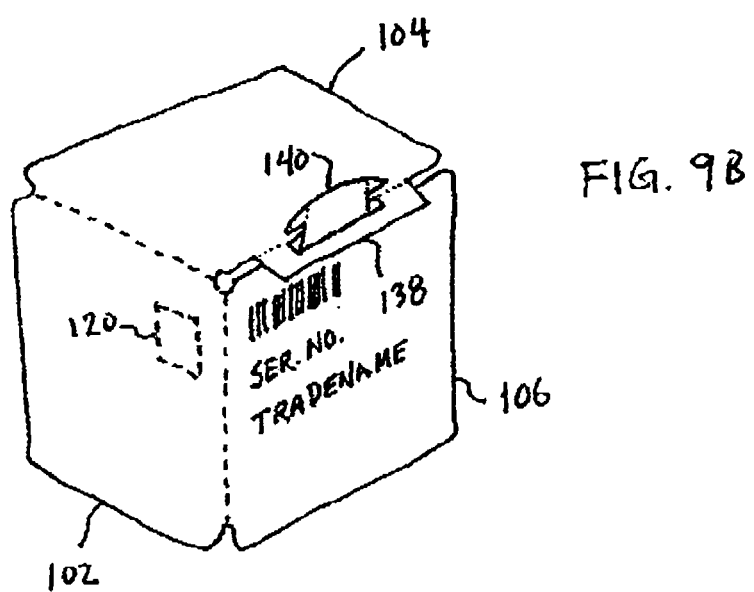
FIG. 9B is a perspective view of the RFID tag in FIG. 9A showing the male tab 140 positioned in the female tab 138 for assembly purposes.

The identification device of FIG. 9, indicates a top view of a label style RFID device 122 comprising at least one of a substrate layer 124, a dielectric layer 126, a conductive layer 128, and adhesive layer 130 and a printed layer 132 to provide semi rigid carrier 134 onto which an tag module (IC) 120 is attached. Other circuitry may also be included in the module or associated with the module on the carrier to switch from one antenna frequency band to another or to communicate over more than one frequency simultaneously. There are three sections 102, 104 and 106 made evident when the tag 122 is formed (for example steel rule die). The three sections are made along crease lines 110 that permit the carrier to be orientated parallel with the reader antenna arrays in three planes. The carrier fold is retained in place by male and female tabs 138 and 140 or any other means forming three antenna bearing planes. Such an arrangement enjoys superior communication with a multitude of reader positions.

It may also be recognized that the first identification device may coexist with a second communication device. Hence the need for capacity in the size of the compartment. For example, futurists project a 10 percent improvement in world wide GDP as a consequence of the deployment of wireless communications involving RFID, sensors and actuators.

Therefore, whether the identification device uses band width in the 830 megahertz (cellular), 13.56 megahertz (RF), 1.6 gigahertz (GPS), 1.7-1.9 gigahertz (PCS), 2.4 gigahertz (Bluetooth), 5.8 gigahertz (IEEE802.1 standard for LAN) or surface acoustic wave (SAW), the antenna(s) thereof can be accommodated inside the compartment.

Figure 10:
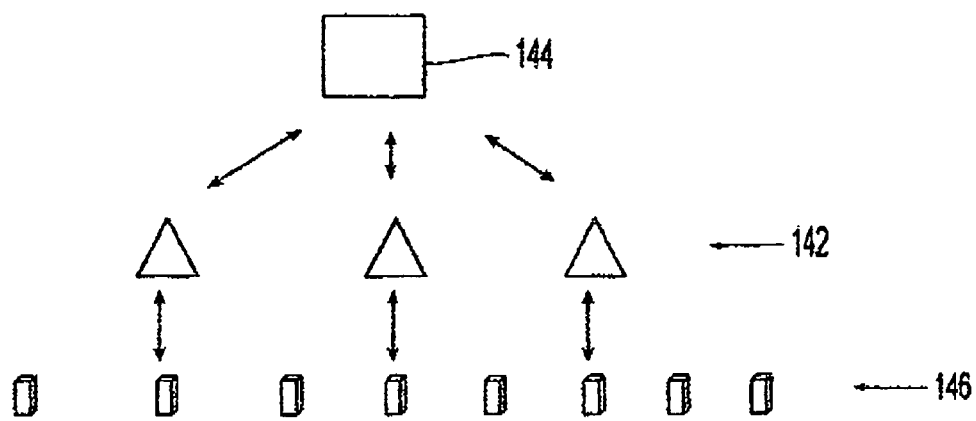
FIG. 10 is a diagram illustrating the prior art of a basic RFID system.
Figure 11:
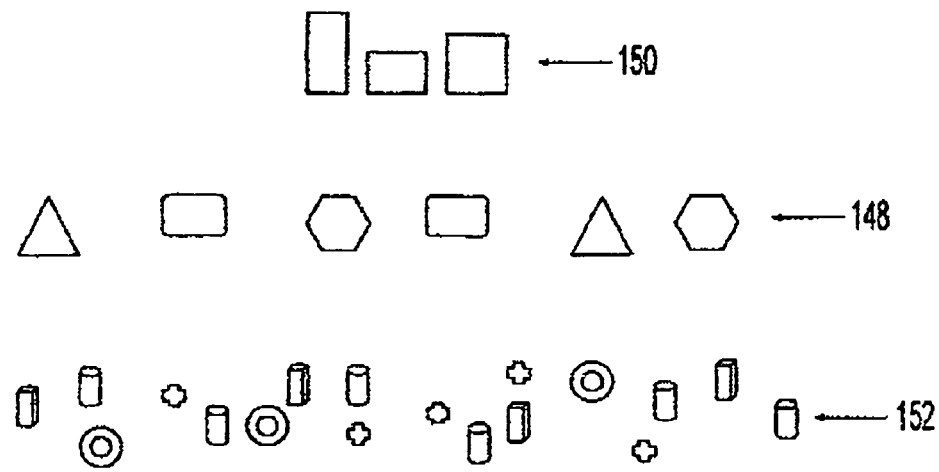
FIG. 11 is a diagram illustrating the complexity of overlapping non-interoperable basic RFID systems.

The prior art of RFID is indicated in FIG. 10 in which a distributed network of readers 142 is deployed to convey data to and from a host 144 and a plurality of tags 146. Today's ID devices including FRID tags are adapted to flourish in the "ideal" reader distributed network 142, where middleware can diagnose and use the data for operational purpose, broadly defined, captured by the system. In the real world however, the RF environment is really indicated by FIG. 11, in which there are a multitude of competitive, proprietary and legacy non-interoperating systems including overlapping distributed reader networks 148, a plurality of non-interactive hosts 150 and a multitude of incompatible tags 152, plus transnational jurisdictional constraints. Together these elements have withheld consensus on a universal agreement on protocol standards.

Figure 12:
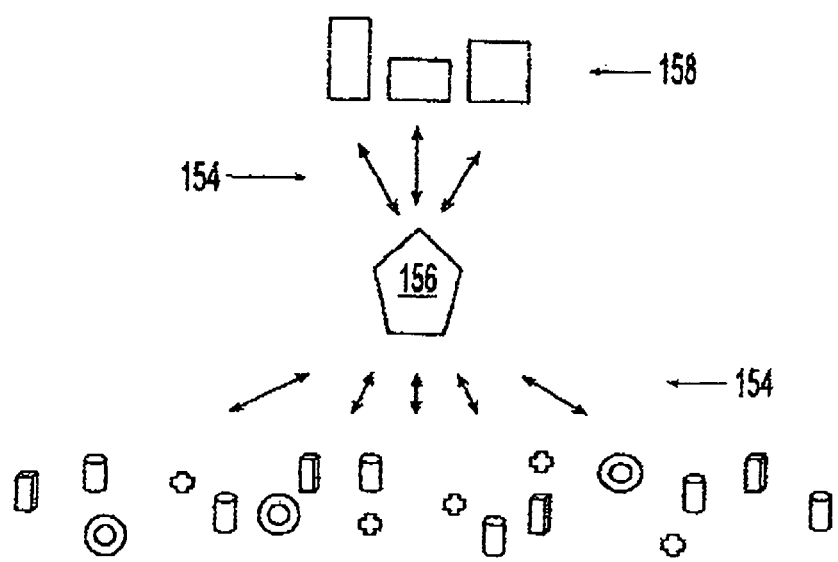
FIG. 12 is a diagram illustrating the invention wherein a cellular network is used to provide a communication link between a pallet ID device and a supply chain host.

Accordingly, "next" generation systems of the inventions hereof are indicated, by way of example, in FIG. 12, in which a pallet communicates directly through a cellular network 154 to a network host 156, without using the distributed network of readers. (Several cellular systems exist to encourage competition of service.) There may be local area interrogators associating the pallet within the a local area supply chain to identify the unit load (i.e. items having associated optical, acoustic or RF identification devices), but the cellular equipment on board the pallet obviates the need to establish distributed networks of readers and is more efficient as the cellular networks already exist.

The association of sensors with local and far range communicators is also contemplated in the present invention. For example, a second identification device 160 could be provided on a rigid circuit board 162, also comprising RF tags for conventional track and trace functionality, for far range wireless communication capability. In one setting a customized pallet is utilized in the storage and transportation of a hazardous material in a multi warehouse supply chain. Each customized pallet is adapted to comply with standards within the jurisdiction that relate to the safekeeping of the hazardous material, such that external environmental conditions, including high temperature exposure, although any external condition or indicator could be monitored, are recorded in real time, such that upon the occurrence of a catastrophic high heat event the second communication device 160 could send out a 911 emergency call to effect the implementation of an emergency protocol. Therefore, in one embodiment the pallet may include a thermo graphic sensor 164 in the base 6 to monitor temperature and upon detection of indications of high or low temperature outside a proscribed range, actuates a LAN communicator 166 in said base to transmit a signal to a LAN receiver 168 in the deck 2, wherein circuitry actuates a cellular communicator 170 to dispatch a 911 signal in association with a unique identification code to identify the pallet and its unit load along with external temperature conditions. Such a capability would improve the productivity of emergency responders and reduce the consequences of environmental damage and distress on a community in the event of hazardous material accidents.

In the present case the second communication device 160 is not developed to communicate with a host over the 2.4 GHz or the 5.8 GHz bands because of the intermediate read ranges of these frequencies (although in other embodiments of pallets more than one band may be utilized for local use, such as by fire and emergency respondents, who within range of 100 yards would be able to read "emergency instruction" signals emanating from the pallet over a Bluetooth hand held or on-board LAN vehicle communication system.) For Example, the pallet may be on the move from one plant to another and there would be a need to communicate instantaneously hundreds of miles in the event of an accident. To achieve this purpose the second identification device includes at least a second antenna, such an 830 megahertz helical coil antenna 172 operating in a cellular frequency band that can send a signal generated by the 911 protocol contained in the IC. The cellular communications components could exist within a separate module added to an identification device or could populate the circuit board along with other devices and modules of the identification device.

The cellular module 170 would be low cost. One must remember that there are 2.2 billion pallets in use in North America. The demand world wide for cellular enabled pallets could be in range of hundreds of millions, providing sufficiently large economies in scale to reduce the cost of simple cellular devices considerably. The embodied cellular module excludes at least one of a touch pad, a screen, a mouthpiece, a speaker, a camera, a vibrator, and a plastic housing which all add costs, and only includes a circuit board and at least one of a transmitting/receiving antenna (i.e. 172), a digital signal processor, a memory chip, a identification reader card, circuitry, and one of an internal or an external power supply. In deed, the cellular module would be disposable to extent that the value added benefits of remote data transfer would be captured by the cellular network host through the sale of used band width or the like over a period of use, as is the routine with cellular telephony. One would assume the cellular module would be given away to lock up the income stream that will result from a service contract involving the use of digital bandwidth.

Figure 13:
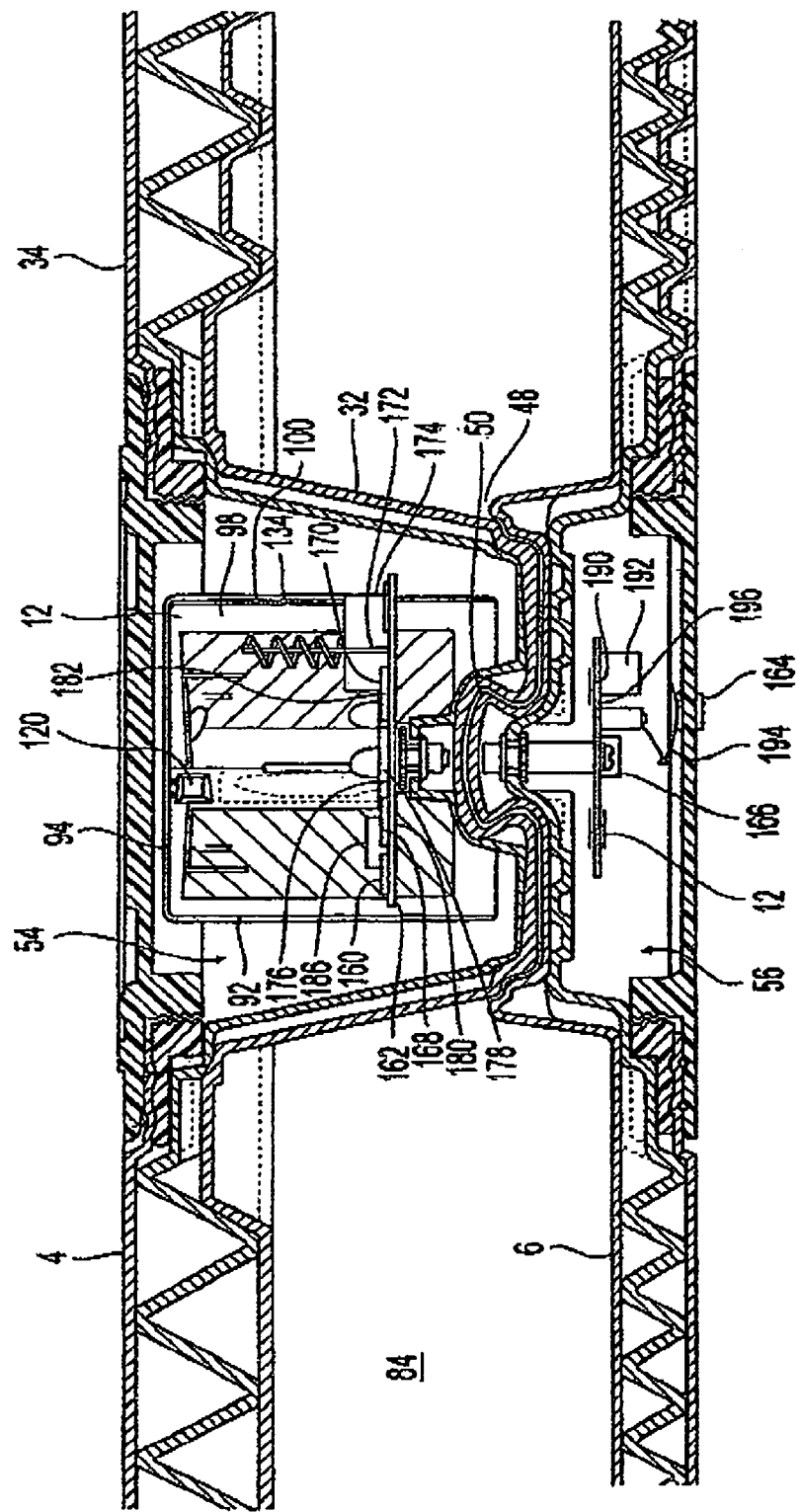
FIG. 13 is a side elevation section showing the combination of the deck and the base of FIGS. 7 and 8 respectively wherein the ID devices and communications modules of the invention are protectively housed within the compartments of the present invention.

Other devices that may populate the circuit board(s) in the respective compartments of a pallet are suggested in FIG. 13 in which at least one of the following components are contemplated: power supplies 174 (including conventional batteries, mechanical renewable power supply devices, solar batteries and RF energy harvesting apparatus); antenna arrays 176; Bluetooth communications modules 178; LAN communications modules 180; PCS communications modules 182; cellular communications modules 184; GPS communications modules 186; an interrogation module 188; RFID communications modules or tags 190; sensor modules 192; sensor probe assemblies 194; integrated circuitry and memory devices 196.

Figure 14:
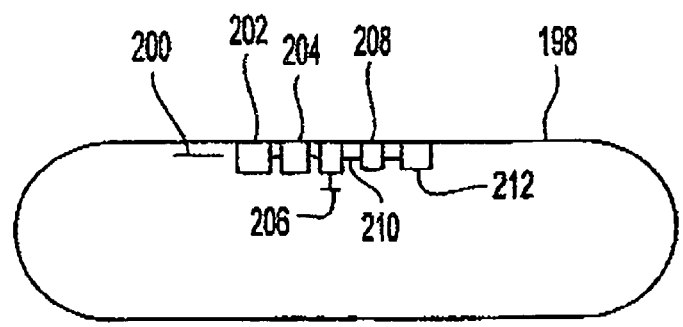
FIG. 14 is a side view of a section of a fuel tank for moving vehicles showing an electronic device with a RFID device, a wireless communications module, a sensor module, a sensor assembly, an actuator and a power supply.

Referring now to FIG. 14 there is seen a fuel tank 198, such as a fuel tank for an automobile, containing an ID device 200 selected from a group of at one of a passive tag, a battery-powered semi-passive tag or an active tag. In addition, the fuel tank contains at least one of wireless communications device 202 selected from a group comprising a Bluetooth communications module, a LAN communications module, a PCS communications module, a cellular communications module, a GPS communications module, and an interrogation module. Furthermore, the fuel tank includes at least one sensor module 204, a sensor probe assemblies 206, and actuator 208, integrated circuitry and memory devices 210, and a power supply 212.

Referring now to FIG. 15 a view of the circuit board assembly contained in the compartment of the deck is shown and described.

FIG. 15 shows the rigid circuit board assembly 162 shown the top compartment 54 of the deck of the pallet in FIG. 13. The pallet apparatus may include a second or more rigid circuit board assemblies, such as the one illustrated in the bottom compartment 56 of the base of the pallet in FIG. 13. At least one circuit board includes an RFID reader/writer interrogator configured to identify a plurality or sub-set of the RFID item tags associated with articles supported upon the pallet, in order to conduct an inventory check to maintain an accurate pallet manifest and record.

As indicated in FIG. 1, the top surface of the pallet is adapted to support a load of articles. The RFID reader/writer interrogator is positioned on the pallet and configured to direct a radio frequency query signal to the load of articles in order to establish a communications link with the RFID item tags affixed to the articles of a dynamic pallet load. As seen in FIG. 13, RFID reader/writer interrogator 188 is located on the circuit board positioned in the compartment adjacent to the load surface.

The one or more RFID reader/writer interrogators are also optionally in communication with RFID pallet tags. A plurality of RFID pallet tags may be positioned on one pallet. FIG. 14 shows a circuit board with five RFID pallet tags. For example, one such tag may be dedicated to manufacturing, material and recycle information storage. One tag may be specifically adapted for pallet tracking within the distribution system. The pallet may also host a third RFID device specified by third parties for specialized inventory tracking activities within closed-loop or associated distribution networks. A fourth tag may be developed to consolidate the data arrays of several tags attached to items transported upon the pallet for more efficient data compression and transfer. A fifth tag may be adapted for interfacing with the RFID system deployed by the trucking industry. FIG. 15 shows a schematic of a power supply arrangement for the RFID pallet tags.

The one or more RFID reader/writer interrogators are also optionally in communication the RFID beacon tags positioned in RFID networks distributed along the pathways take by the pallet. The RFID reader/writer interrogator communicates with external RFID tags directly, and obtains data indicative of the RFID beacon tags from the RFID pallet tags. A pallet position determination can be made when the RFID reader/writer interrogator obtains a radio frequency signal from an RFID beacon tag or the RFID pallet tag obtains a radio frequency signal from an external RFID reader/writer interrogator, such as a door way portal.

As seen in FIG. 14, the circuit board assembly 162 includes an electromagnetic interference (EMI) shield 141. The EMI shield is positioned below the support surface and the RFID reader/writer interrogator is positioned between the EMI shield and the support surface. The EMI shield is beneficially positioned to reflect the query signals from the RFID reader/writer interrogator toward the intended articles or sub-set of articles in the pallet load. The EMI shield also is provided to prevent tag reading interference. The RFID reader/writer interrogator may also utilize a directional antenna in order to ensure the RFID reader/writer interrogator can reliably conduct a real-time inventory of the goods on the pallet.

The RFID reader/writer interrogator may utilize an array of antennas in order to communicate with a plurality of RFID tags indicative of the pallet load, condition and location. The integrated communication modules for connecting the RFID reader/writer interrogator to the LAN, WLAN and cellular networks each contain additional antenna, so that the pallet apparatus can have a dozen antennas if each of the five RFID pallet tags shown in FIG. 14 have a separate antenna. The RFID reader/writer interrogator can have an antenna array operating on several radio frequencies and the LAN, WLAN and cellular modules can have more than one antenna for multiple communications purposes.

Any combination of devices could be assembled to provide a pallet with a plurality of IDs and functional properties. A combination of devices can be situated in a plurality of compartments. From time to time the cover can be removed to access devices within a compartment so that the devices can be changed to customize a pallet for an intended application. In other cases the compartment is populated with a plurality of devices that operate in multiple operating environments prevalent throughout the supply chain.

The inventions contemplate using the Internet for the sharing of data obtained from the devices. The Internet is also used to deliver data processed by a host to the devices. The Internet connection can be made remotely through an interrogator with a direct or indirect connection to the Internet or internally by one or more of the communications devices located in the pallet.

All of the above U.S. patents, U.S. patent application publications, U.S. patent applications, foreign patents, foreign patent applications and non-patent publications referred to in this specification and /or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of embedding an RFID device in a reusable object including the steps of:
    embedding an RFID device in a multi-layer structure between two adjacent layers thereof, the multi-layer structure including at least top and bottom layers having respective exposed surfaces and having no adhesive layer on the exposed surface of either of said top and bottom layers;
    inserting the multi-layer structure having said RFID device embedded therein into a cavity of an interior of a pallet having a support base and a top surface forming said cavity; and
    non-removably securing said top surface to said support base to embed the multi-layer structure within the pallet cavity.

2. A method as set forth in claim 1, wherein,
said support base defines a plurality of support feet for the pallet and said cavity is defined within an interior of at least one of said support feet.

3. A method of as set forth in claim 2 which includes,
extending said cavity from an opening in an exterior surface of said pallet to an interior of said pallet, and
inserting said multi-layer structure into said cavity through said opening.

4. A method as set forth in claim 1, wherein,
said support base defines a plurality of support feet for the reusable object and said cavity includes an interior of at least one of said support feet.

5. A pallet structure comprising:
a multi-layer laminate structure including at least a top layer and a bottom layer having respective exposed surfaces, and having no adhesive layer on the exposed surface of either of said top and bottom layers;
an RFID device embedded in the multi-layer laminate structure between adjacent layers thereof and including an integrated circuit coupled to an antenna; and
a pallet including a top member and a bottom member forming an interior cavity as an integral portion of said pallet for receiving said multi-layer laminate structure therein; and
said multi-layer laminate structure being non-removably sealed within said cavity.

6. A method of embedding an RFID device in a reusable object including the steps of:
embedding an RFID device in a multi-layer structure between two adjacent layers thereof, the multi-layer structure including at least top and bottom layers having respective exposed surfaces and having no adhesive layer on the exposed surface of either of said top and bottom layers;
providing a reusable object having a cavity extending into an interior of the reusable object;
inserting the multi-layer structure having said RFID device embedded therein into a cavity of an interior of reusable object having a support base and a top surface forming said cavity; and
non-removably securing said top surface to said support base to embed the multi-layer structure within the reusable object cavity.

7. A reusable pallet, comprising:
a multi-layer laminate structure including at least a top layer and a bottom layer having respective exposed surfaces and having no adhesive layer on the exposed surface of either of said top and bottom layers;
an RFID device embedded in the multi-layer laminate structure between adjacent layers thereof and including an integrated circuit coupled to an antenna; and
said reusable pallet including a top member and a bottom member forming an interior cavity as an integral portion of said reusable pallet for receiving said multi-layer laminate structure therein; and
said multi-layer laminate structure being non-removably sealed with said cavity.

8. A reusable pallet as set forth in claim 7 which includes,
a first molded plastic pallet component defining a load support platform and a second molded plastic component defining a platform reinforcement base with a plurality of feet to suspend the platform off the ground, and
said first and second molded plastic components being permanently secured together.

9. A reusable pallet as set forth in claim 8 wherein,
said interior cavity is formed in at least one of said feet.

10. A reusable pallet as set forth in claim 7 wherein,
the multi-layer laminate structure is inserted into the interior cavity before said top member and said bottom member are permanently secured together.

11. A reusable pallet as set forth in claim 7 in which,
an exterior cavity is formed in one of the top member and the bottom member.

12. A reusable pallet as set forth in claim 11 which includes,
a sealing device for closing the exterior cavity to seal an electronic device within the exterior cavity.

13. A reusable pallet as set forth in claim 12 wherein,
the sealing device is removable to provide access to the exterior cavity.

* * * * *